(No Model.) 2 Sheets—Sheet 2.

O. HEILMAN.
TRUCK FOR HANDLING PIPE.

No. 372,976. Patented Nov. 8, 1887.

Witnesses
Inventor
Otto Heilman
By his Attorney
Chas. J. Gooch

UNITED STATES PATENT OFFICE.

OTTO HEILMAN, OF TIFFIN, OHIO.

TRUCK FOR HANDLING PIPE.

SPECIFICATION forming part of Letters Patent No. 372,976, dated November 8, 1887.

Application filed August 20, 1887. Serial No. 247,474. (No model.)

*To all whom it may concern:*

Be it known that I, OTTO HEILMAN, a citizen of the United States, residing at Tiffin, in the county of Seneca and State of Ohio, have invented certain new and useful Improvements in Pipe Turners and Transporters; and I do hereby declare the following to be a full, clear, and exact description of the invention, such as will enable others skilled in the art to which it appertains to make and use the same.

My invention consists of a novel device for turning and transporting green sewer and other pipes.

The invention comprises a frame or truck supported on suitable transporting wheels or rollers, a suitably-shaped metal-faced frame or trough pivotally journaled at its sides in the truck or main frame to permit of said inner frame or trough rotating, a transverse roller-frame secured to the upper portion of said trough to permit of the pipe easily sliding off the trough when turned, a plate which passes under the pipe-supporting drying-plate and supports the same and the pipe on the trough, rods pivoted to the sides of the truck and having curved or hook-shaped lower ends to engage the pipe-supporting plate and hold it, and the pipe thereon, on the turning frame, and spring rod-securing clips, and a hook and eye for locking the turning frame.

Figure 1:
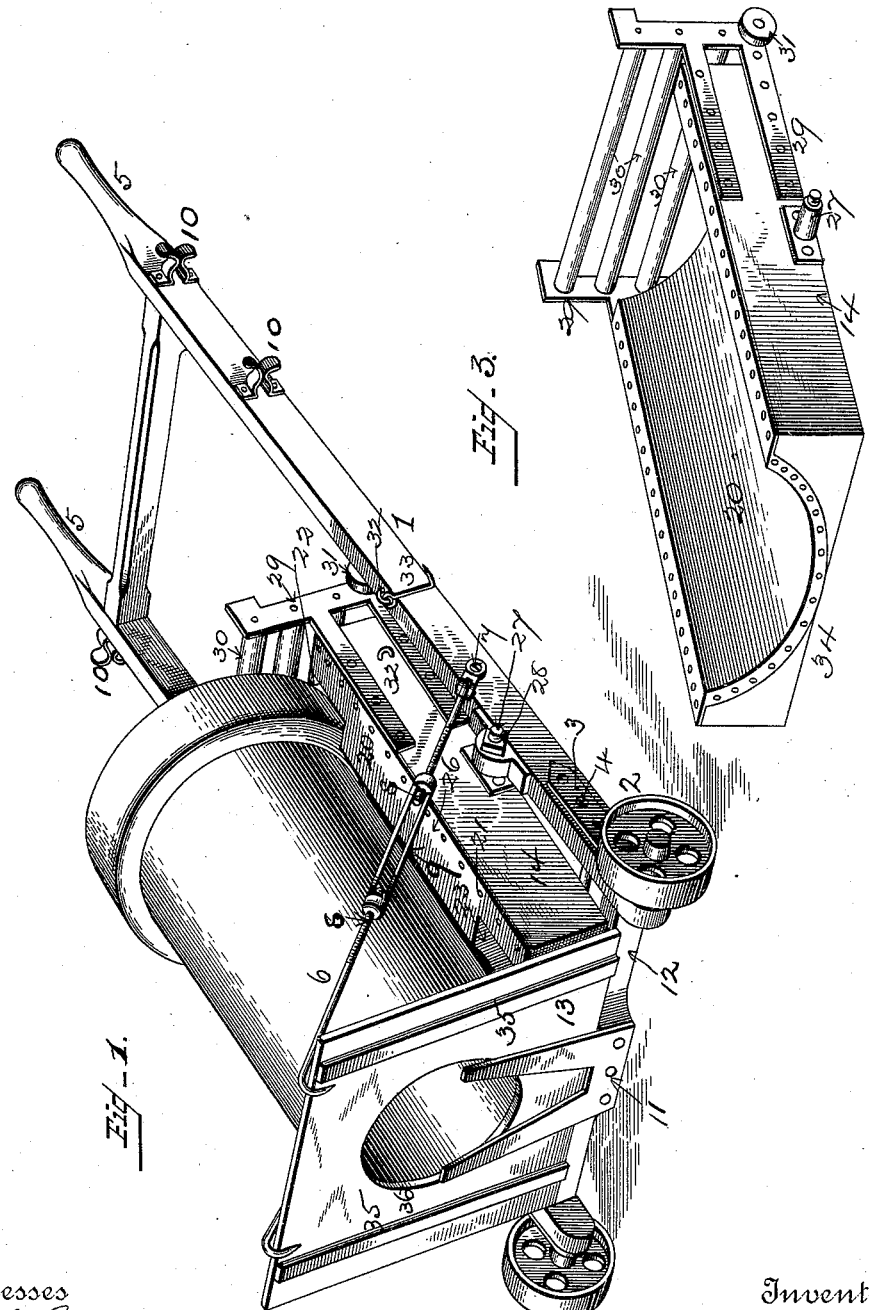
Figure 2:
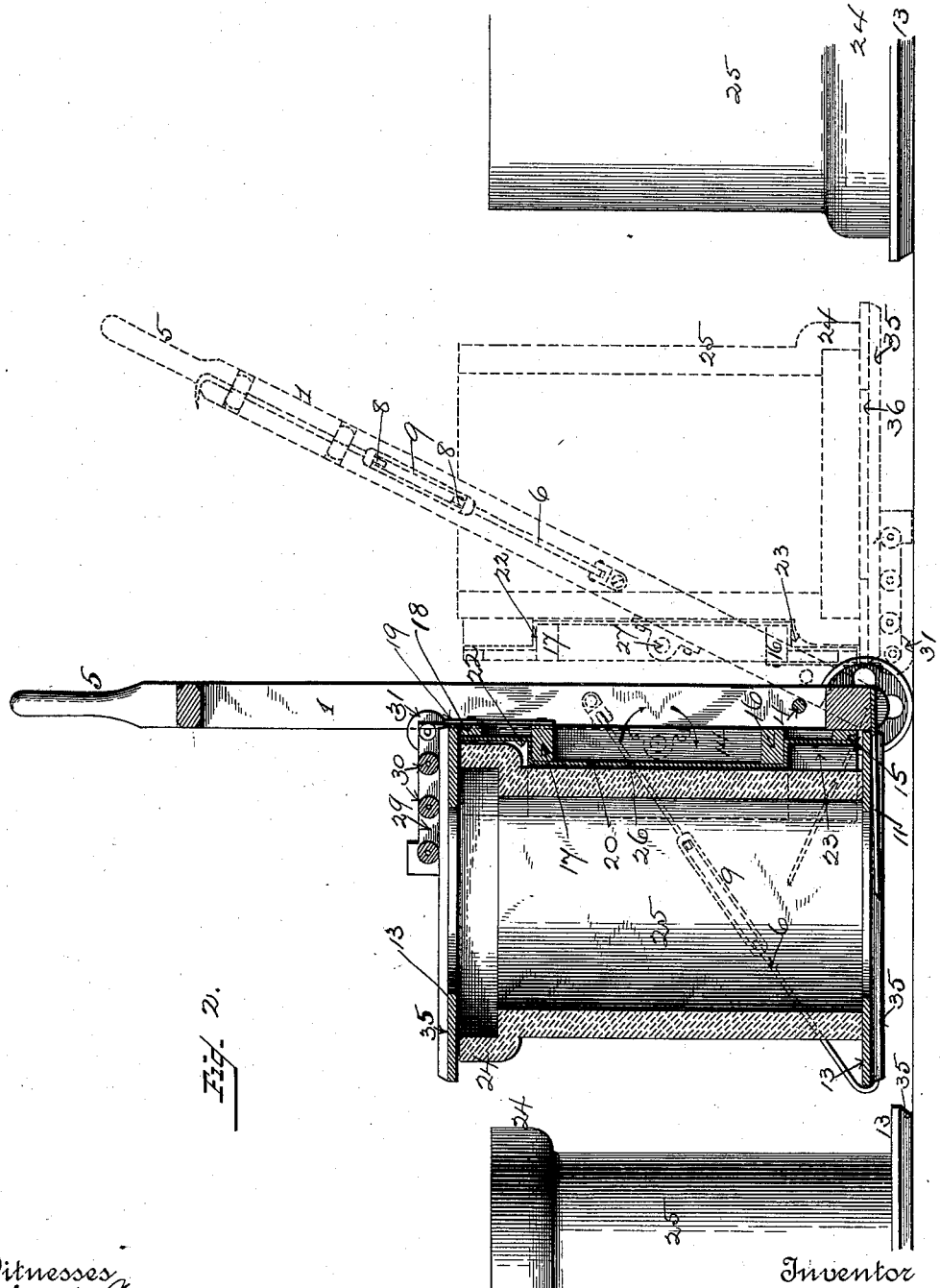

In the accompanying drawings, Figure 1 represents a perspective view of the complete device. Fig. 2 represents a sectional elevation thereof, this view showing, first, to the left, the position of the pipe to be turned; second, a pipe in position on the turning frame in readiness for either transportation or turning, and, third, in dotted lines, the position of the parts after the pipe has been turned. Fig. 3 represents a detail view of a turning-frame adapted for use with straight or flangeless pipes.

1 represents the truck or main frame, which is preferably constructed of wood on account of its lightness, though any other suitable material may be employed.

2 represents wheels or rollers secured to the bottom of the side bars of the frame 1, by straps 3, or otherwise, so as to support said truck-frame above the ground and permit of its being readily rolled from place to place.

4 represents a brace-rod, bracing the lower end of the truck-frame and assisting in securing the straps 3 thereto.

5 represents the handles of the hand-grasps of the truck.

6 represents hooked rods pivoted at one end, as at 7, to the outer sides of the truck to permit of their being readily turned down to grasp the pipe-supporting plate, to be presently described. Each of these rods 6 is formed in two parts, with screw-threaded inner ends, 8, which are connected by an interiorly-screw-threaded thimble or link, 9, to permit of said rods being shortened or lengthened, as desired, to accommodate pipes of different lengths.

10 represents spring arms or clips secured to the sides of the truck-frame to receive and hold the rods 6 in elevated position when out of use. Of these spring arms or clips there may be two or more on each side of the frame to hold the rods, whatever their length of adjustment.

11 represents a metal plate, which may either be forked, as shown, or plane, as desired, attached to the bottom bar, 12, of the truck at or about the center thereof and projecting forwardly thereof, as shown, which plate, when it is desired to lift a pipe onto the turning frame, is pushed under the wooden plate 13 supporting the pipe.

The pipe-turning frame consists of a wooden framing composed of side pieces, 14, and end pieces, 15 16 17 18, suitably connected together at their points of juncture and braced transversely, as at 19. The front edges or faces of the transverse end pieces, 15 16 17 18, are curved or disk-shaped, as shown, to receive a metal facing-plate, 20, which is curved or dish-shaped, as shown, and is at its side edges secured to the sides of the turning frame by nails 21 or otherwise, the top and bottom edges of said metal sheathing being either lapped over the top and bottom pieces of the turning frame and hammered down thereon or thereinto, or otherwise secured thereto, as by nailing, as desired. This metal sheathing, which I denominate a "trough," may either be swaged or otherwise formed out of a single piece of metal with suitable depressions, 22 23, at each end, as represented in Figs. 1 and 2 of the drawings, to receive the flanged end 24 of the pipe 25 in the respective positions it assumes while being manipulated in connection with this device, or such sheathing may be formed with either or both of the end pieces, 22 23, separate from the central piece, 26, in which case such sections would be connected together at their points of juncture by solder, cement, or other suitable means.

The pipe receiving and turning frame is mounted within and has pivoted bearing in or on the sides of the truck-frame on a rod, 27, having a screw-threaded end, with which a nut, 28, engages, whereby, upon removing said nut 28, the rod 27 can readily be drawn out and the turning frame removed, and another, either of the same character or one adapted for employment with flangeless or other shaped pipes, substituted.

29 represents eared or flanged plates secured to the upper ends of the outer faces of the sides of the turning frame, between which are journaled transversely-extending rollers 30, upon which the plate supporting the pipe when turned rests. The object of this roller-frame 29 30 is to facilitate the removal of the turned pipe from the turning frame, as, upon the pipe being turned, it and the plate upon which it rests can, by means of such rollers, be readily slid off and away from the frame.

31 represents rollers or wheels on the rear of the roller-frame 29 30 for the purpose of frictionlessly supporting the turning or tilting frame in its tilted position and permit of its ready travel with the truck-frame along the ground when necessary.

32 represents eyes attached, respectively, to the side of the turning frame, and to the truck-frame, and 33 represents a hook secured to one of said eyes and adapted to engage with the other eye for the purpose of securing the turning frame in position and prevent its turning on its pivot, during transportation from place to place.

34 (Fig. 3 of the drawings) represents a pipe-receiving and tilting frame adapted for use with flangeless pipes. In this illustration the frame is of the same construction to the frame heretofore described, except that the sheathing or trough is formed with a plane curved face that is without the depressions heretofore mentioned, to receive the flanges on the flanged pipes.

Ordinarily in the manufacture of sewer and other pipes of plastic material the custom has been to place the green pipe upon the ordinary supporting-plate, 13, of wood, having on its under side cleats or ribs 35, to raise said plate above the ground and permit the passage of air under said plate and up through a central hole, 36, therein to and through the pipe thereon, and when it was desired to turn such green pipe end for end, the custom has been for workmen to place another of such plates 13 on the top of the pipe, and then, grasping the plates resting against the top and bottom of said pipe and pressing them against the pipe, turn the whole bodily over by hand. Such a procedure possesses several objectionable features, some of which are that it required the labor of several men to turn each pipe. The pipe was liable to be injured by the pressure exerted on its ends. The pipe was apt to fall or slip, or be dropped or let down too heavily at one or another portion. By the aid of my device these and all objections incident to the hand-turning of green pipes are obviated, the turning can always be safely and speedily accomplished, and pipes transported from place to place without danger of injury thereto.

In operation I proceed substantially as follows, referring to Fig. 2 of the drawings: The green pipe which it is desired to turn or to remove from the place where it rests, as at the left hand in Fig. 2, upon the customary airing and supporting plate, 13, and transport to another location, as at the right hand in Fig. 2, is approached by a single operative with the truck having the turning device thereon. The truck is held in vertical position, and the metal plate 11, projecting from the bottom thereof, pushed under the plate 13, as shown in full lines. The hooked rods 6 are then released from the spring-clamps 10 and hooked over and under the front edge of the plate 13. Another plate 13 is then placed on the top of the pipe 25, with its inner portion abutting against the rollers 30 in the roller-frame 29, and its rear edge abutting against the stop and bracing-strips 19. In this position the pipe is held on the turning-frame, and can readily and safely be transported from place to place by slightly tilting the truck-frame in the manner represented in Fig. 1 of the drawings. When it is desired to turn the pipe end for end, as represented at the right hand of Fig. 2 of the drawings, the truck-frame is lowered to a horizontal or nearly horizontal position, so as to bring the major part of the weight of the pipe rearwardly, and cause the turning or tilting frame to rock over rearwardly upon its pivots 27, with the wheels or rollers 31 resting upon the ground. The truck-frame is then raised vertically on the rod 27, which act assists the turning or tilting frame in assuming a vertical position, with the heretofore upper end of the pipe assuming a lower position, the plate 13, heretofore the upper one, now being the lower. The operation of the device thus mentioned is clearly represented in dotted lines in Fig. 2 of the drawings. When the pipe has thus been turned, the hooked rods 6 are released and engaged with the spring-clamps 10, and the plate 13, with the pipe thereon, can be readily slid off the roller-frame 29 30 into the turned position indicated at the right of Fig. 2. The turning frame can then be turned back to the position shown in full lines in Figs. 1 and 2, in readiness for reuse.

Although I have described my device as adapted for turning and transporting pipes formed of plastic material while green, it is evident that it is equally applicable for use in turning and transporting baked pipes and pipes of other nature than those herein referred to.

Having thus described my invention, what I claim is—

1. The pipe turner and transporter herein described, comprising a truck, a trough or frame pivotally supported on said truck to permit of its turning therein, and having a metal sheathing or front of a contour to adapt it to receive the pipe to be turned, a projecting plate on the bottom of the truck to engage the pipe-supporting plate, a roller-frame secured to the top of the pivotal or pipe-turning frame, hooked rods pivotally secured to the truck and adapted to engage and hold the pipe-supporting plate, spring-clips to hold said hooked rods out of operation, and a securing device, substantially as described, for locking the pipe-turning frame and truck together.

2. A pipe-turner comprising a truck or transporting frame, a pipe receiving and turning frame or trough having pivotal bearing within said truck-frame to permit of its swinging and rotating between the side bars of said truck-frame, and having a curved front face of a contour to adapt it to receive the pipe to be turned, and a roller-frame and rollers attached to the upper part of the turning frame to receive and hold the pipe while being turned, substantially as set forth.

3. A pipe-turner comprising a main frame and a pipe-support pivoted to said main frame with capability of turning over vertically end for end therein, substantially as set forth.

4. In a pipe turner and transporter, the combination of a main frame or truck and a pipe-receiving frame pivotally mounted upon said truck-frame with capability of ready removal from and placing in position thereon, and so as to permit of its automatically turning over vertically end for end therein.

5. A pipe turner and transporter comprising a truck having a projecting plate to receive the pipe to be turned, a pipe receiving and turning frame or support having removable pivotal bearing in said truck-frame to permit of its ready removal therefrom and connection thereto, and also to permit of its automatically turning end for end, as explained, and a series of rollers suitably journaled in a frame secured to the upper portion of the pipe-support to receive and support the pipe during turning and when in turned position.

In testimony whereof I affix my signature in presence of two witnesses.

OTTO HEILMAN.

Witnesses:
 CHAS. J. GOOCH,
 M. DORIAN.